May 23, 1967

T. C. WERGE 3,320,916

CAN BODY MAKING MACHINE

Filed June 26, 1964

INVENTOR.
THOMAS C. WERGE
BY
Edward B. Gregg
ATTORNEY.

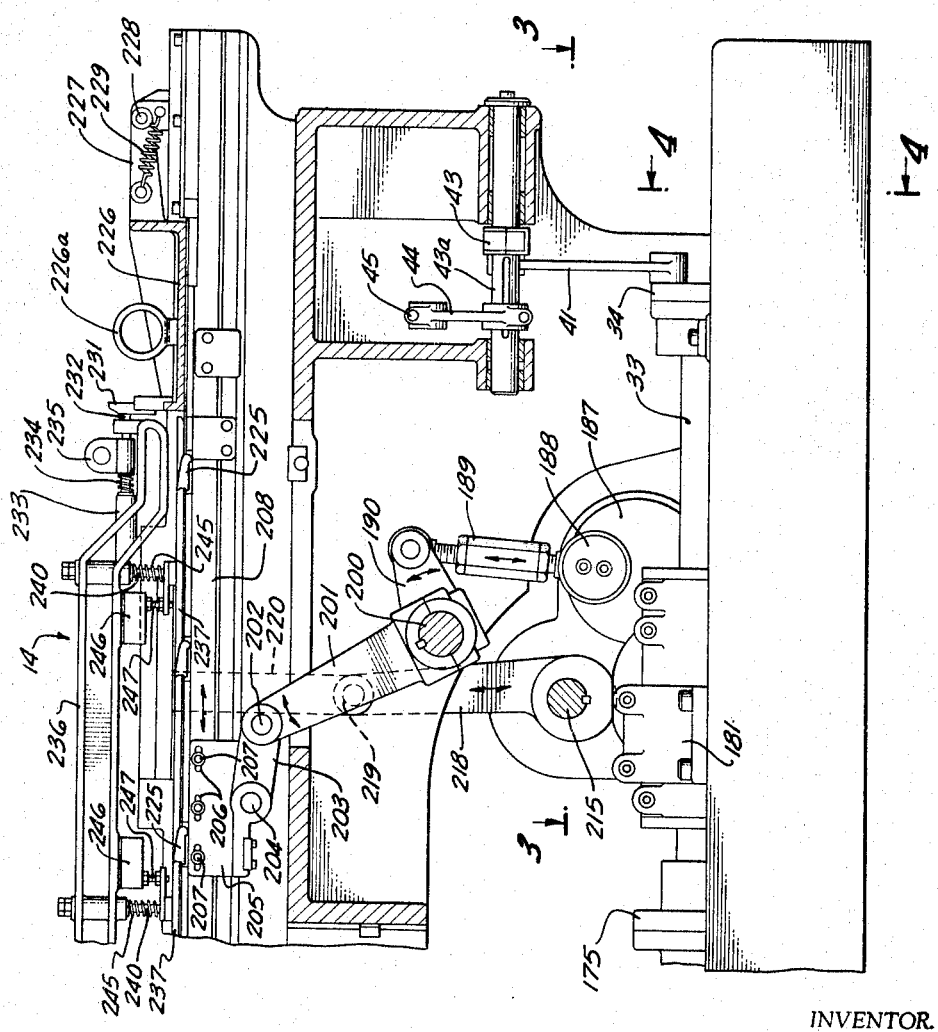

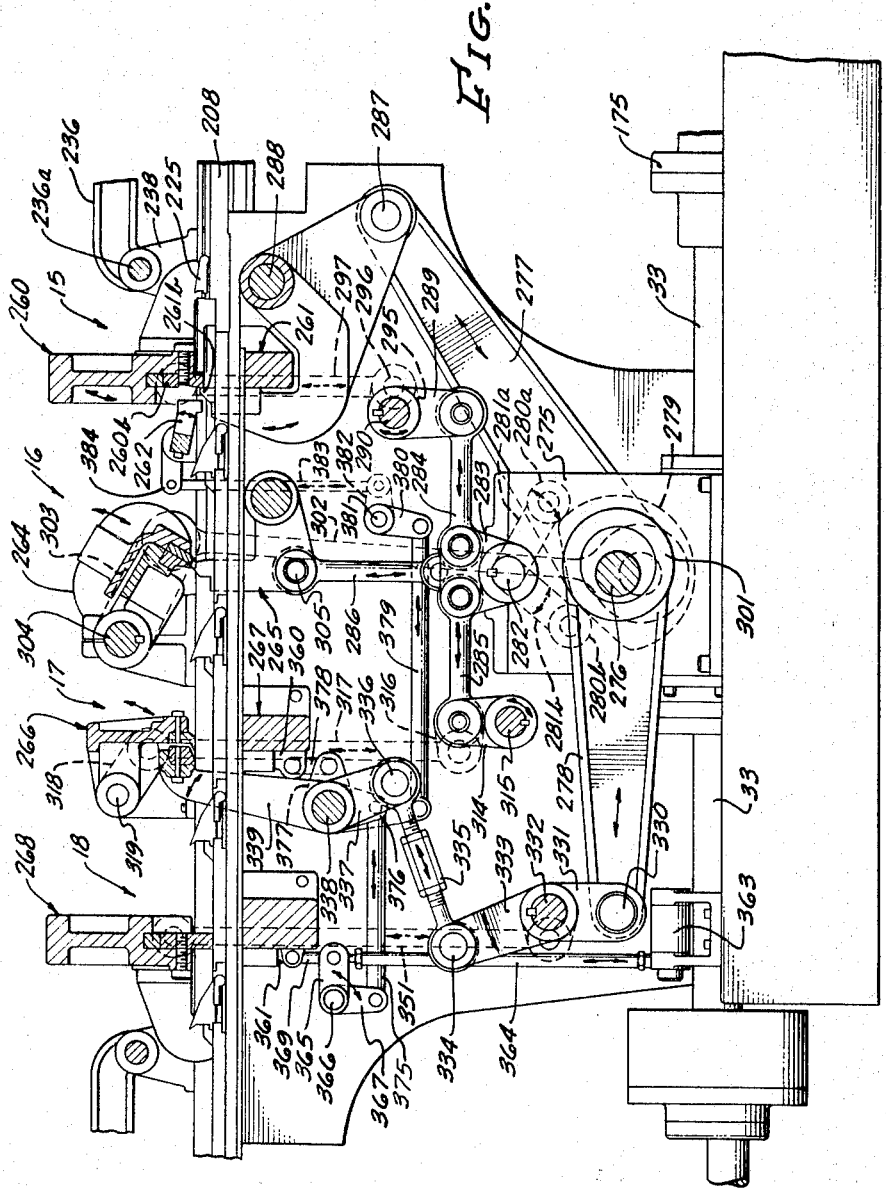

May 23, 1967

T. C. WERGE 3,320,916

CAN BODY MAKING MACHINE

Filed June 26, 1964

INVENTOR.
THOMAS C. WERGE
BY
Edward B. Fregg
ATTORNEY.

May 23, 1967  T. C. WERGE  3,320,916
CAN BODY MAKING MACHINE
Filed June 26, 1964  9 Sheets-Sheet 5
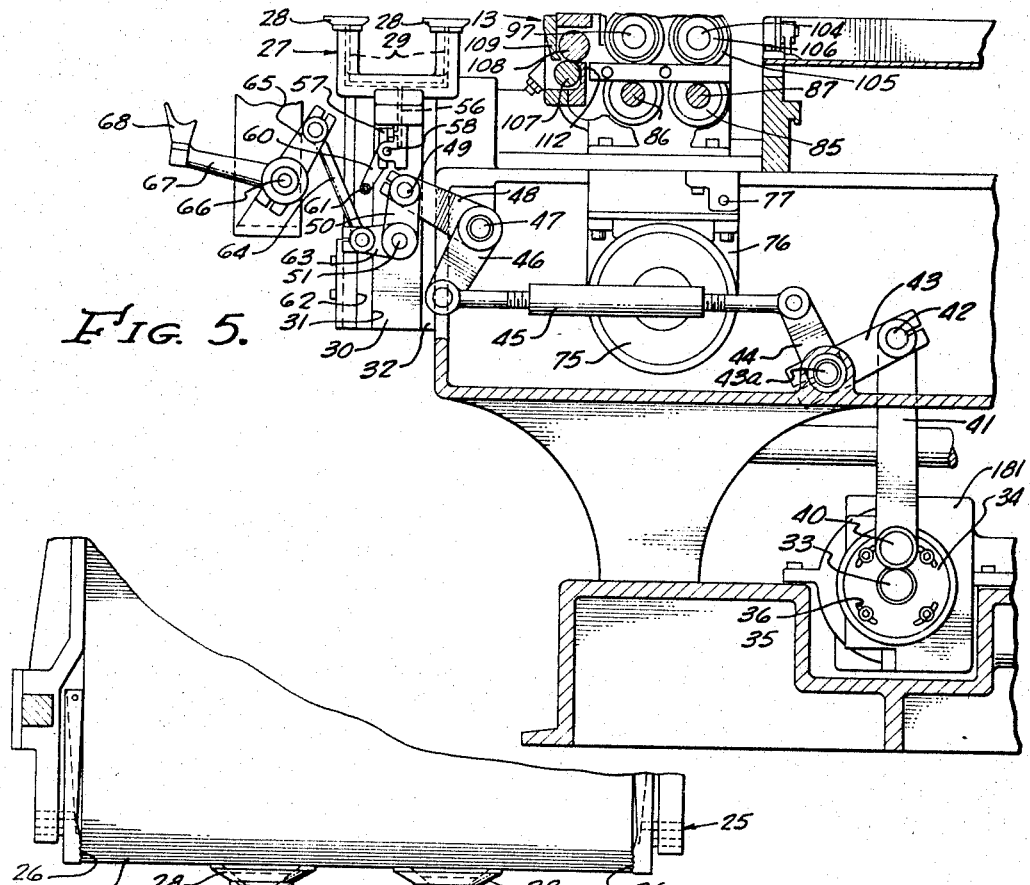
Fig. 5.
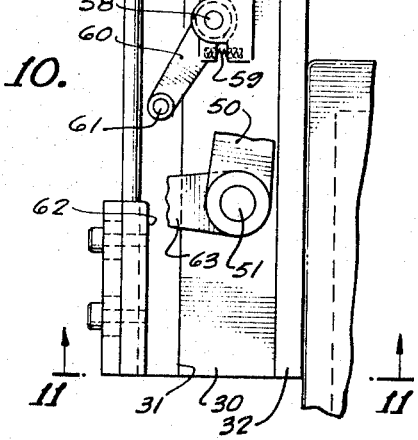
Fig. 10.
Fig. 11.
INVENTOR.
THOMAS C. WERGE
BY
ATTORNEY.

May 23, 1967 T. C. WERGE 3,320,916
CAN BODY MAKING MACHINE
Filed June 26, 1964 9 Sheets-Sheet 6

INVENTOR.
THOMAS C. WERGE
BY
ATTORNEY.

May 23, 1967  T. C. WERGE  3,320,916
CAN BODY MAKING MACHINE
Filed June 26, 1964  9 Sheets-Sheet 7

INVENTOR.
THOMAS C. WERGE
BY
Edward B. Gregg
ATTORNEY.

INVENTOR.
THOMAS C. WERGE
BY
ATTORNEY.

INVENTOR.
THOMAS C. WERGE
BY
ATTORNEY.

United States Patent Office 3,320,916
Patented May 23, 1967

3,320,916
CAN BODY MAKING MACHINE
Thomas C. Werge, 1441 N. Kirby Drive,
La Habra, Calif. 90631
Filed June 26, 1964, Ser. No. 378,195
17 Claims. (Cl. 113—7)

This invention relates to a can body making machine, more particularly for the manufacture of tubular can bodies to which ends or covers are to be applied and which embody a tear strip to be removed by means of a key. Such key open cans are used for holding food products such as coffee, lard, shortening and the like where the content of the can is used gradually and it is desired to use the cover to keep the can more or less airtight until the can has been emptied.

In such can bodies the usual operations of flexing to break the grain of the metal; of notching and slitting to allow for extra metal thickness at the juncture of can body side seam and the double end seam; and of hook forming to form body hooks which form the side seams, are carried out. The thus formed body blanks (i.e., flat metal strips which have been flexed, notched and slit and formed with hooks) are then wrapped about a horn or mandrel; the hooks are interengaged and hammered to form the side seam; and the resulting tubular bodies are then caused to pass through a soldering station to solder the side seams.

The machine of the present invention is capable of performing these operations and, in addition, it is capable of forming a tear strip on the body which includes the following operations:

(1) Scoring to condition a strip of the metal adjacent one end of the body so that it can be removed with a key, (2) Beading to form a bead between the score lines to serve as a track for the key when it removes the tear strip.

(3) Blanking to form a projecting tongue to receive the key.

(4) Folding to form a collar fold which receives the top of the can when it has been opened with a key. This folding operation involves four separate steps.

It will be apparent that a body maker capable of performing all of these operations is a more complicated machine than an ordinary can body maker. It is one of the objects of the present invention to simplify and otherwise improve on such a machine.

Other objects including the following:

To make the machine more easily adjustable for cans of different size.

To simplify the driving and timing mechanisms.

The above and other objects of the invention will be apparent from the ensuing description and appended claims.

One embodiment of the invention is illustrated by way of example in the accompanying drawings in which:

FIGURE 1 is a somewhat diagrammatic top plan view of the machine up through the fourth and final collar folding operation.

FIGURES 2A and 2B are consecutive views along the line 2—2 of FIGURE 1. FIGURE 2A shows the feed end of the machine and the part wherein flexing, scoring and notching and slitting are accomplished. FIGURE 2B shows the portion of the machine wherein collar folding is accomplished.

FIGURE 5 is a section taken along the line 5—5 of FIGURE 1 showing the vacuum feed and the flexing and scoring mechanisms for feeding the body blanks into the machine and for flexing and scoring.

FIGURE 10 is a fragmentary view showing the suction feed in elevation.

FIGURE 11 is a view taken along line 11—11 of FIGURE 10;

Figure 1:
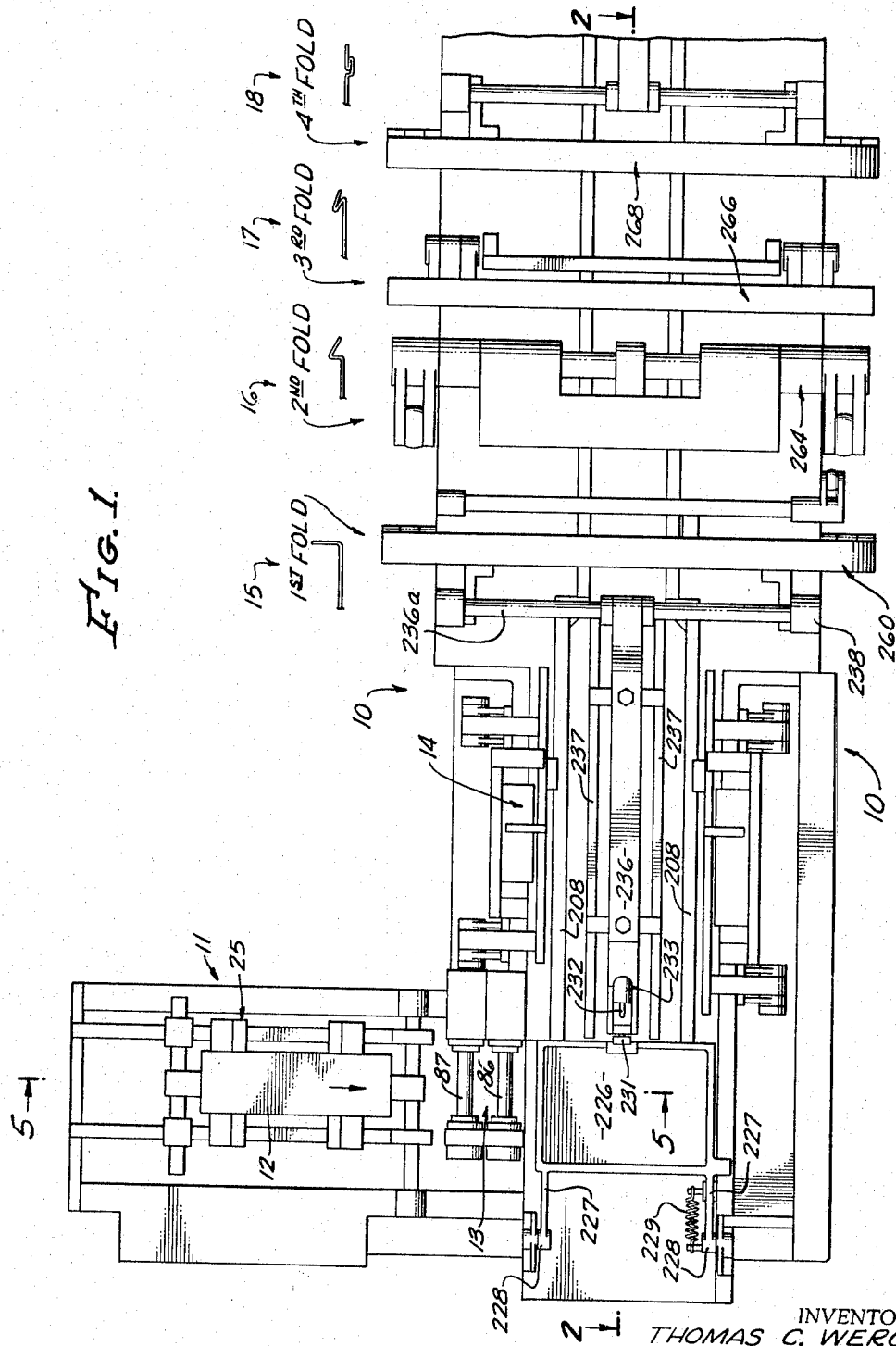

Referring now to the drawings and preliminarily to FIGURE 1, which is a somewhat diagrammatic top plan view of the machine, the machine as a whole is designated by the reference numeral 10. It comprises a hopper and feed station 11 which holds body blanks 12; a beading, flexing and scoring station 13; a notching, slitting and blanking station 14; and four consecutive folding stations 15, 16, 17 and 18. At the beading, scoring and flexing station 13 the body blanks 12 are flexed to properly condition the metal; they are scored to form a tear strip; and they can also be beaded, all in the manner and for the purpose described hereinafter.

At the notching station 14 the blanks are notched and slit in a manner and for a purpose which are well known in the can making art. Briefly, the purpose of such notching and slitting is to allow for extra metal thickness at the junction of the can body side seam and the double end seam when a cover or covers are applied to the body. At the notching station 14 a portion of the metal is also cut away to form a projecting tongue which is intended to engage the key which removes the tear strip and opens the can. At the four consecutive folding stations 15, 16, 17 and 18 the metal blank is folded successively, as illustrated in FIGURE 1 to form a collar fold which is shown as the fourth fold.

Referring now to FIGURES 5, 10 and 11, a stack of blanks 12 is shown in a hopper 25 (see FIGURE 10) the lower end of which has a saw tooth configuration as shown at 26 whereby the blanks are held by the hopper but may be withdrawn by suction in the manner hereinafter described.

Figure 3:
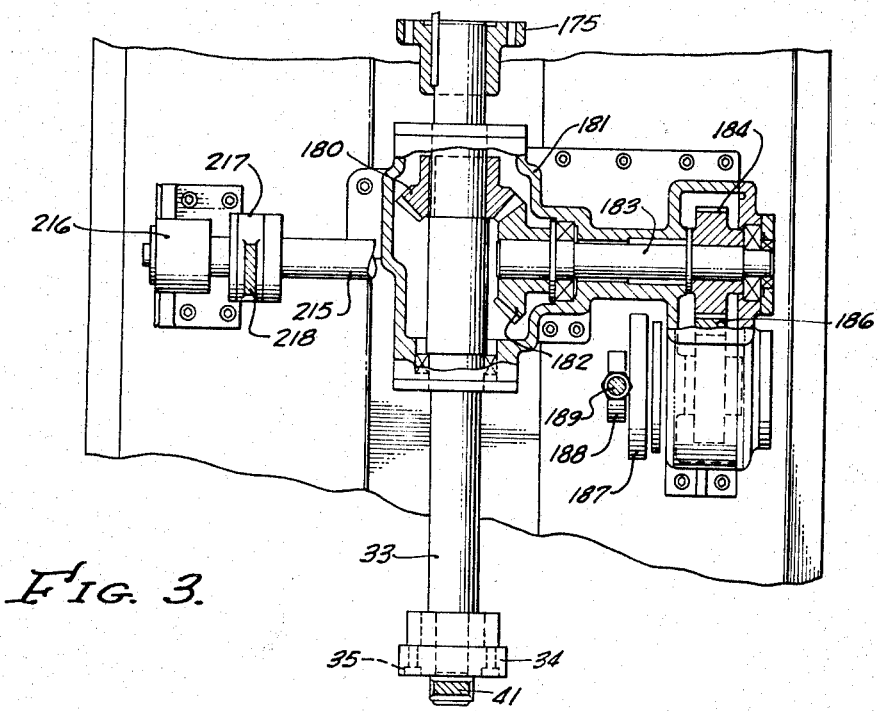
FIGURE 3 is a section taken along line 3—3 of FIGURE 2A and it shows that portion of the driving mechanism which operates the body blank feed, the notching and slitting mechanism and the scoring and flexing mechanism.
Figure 4:
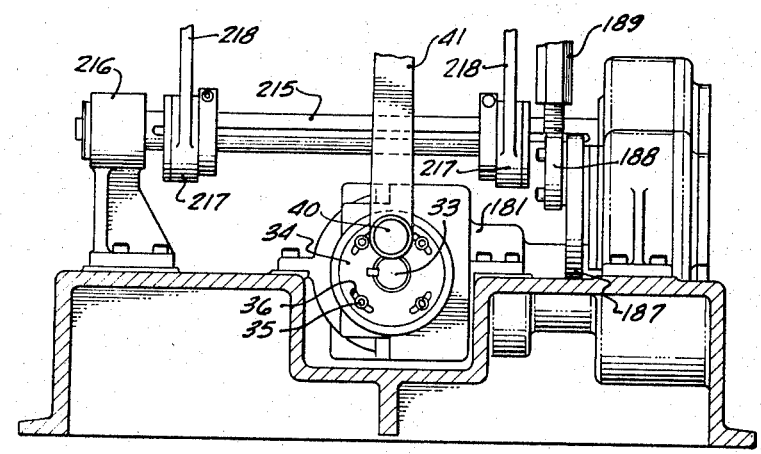
FIGURE 4 is a section taken along line 4—4 of FIGURE 2A showing the same driving mechanism in elevation.

As best shown in FIGURE 10 the withdrawal means consists of a suction feed member 27 which is formed with ducts 29 to apply suction to rubber or other resilient suction cups 28. The suction member 27 is mounted on a slide member 30 which, as best shown in FIGURE 11, has a dovetail shape in cross section and fits slidably in a dovetail recess 31 formed in frame member 32. The drive for the suction member 27 is from a shaft 33 which is shown in FIGURE 5 and also in FIGURES 3 and 4, such being the drive shaft of the entire machine, from which all other elements of the machine are driven, directly or indirectly, in properly timed relation as explained in detail hereinafter. As shown in FIGURES 3, 4 and 5 a crank disc 34 is adjustably fixed to the drive shaft 33 by means of screws 35 and elongated slots 36. This allows rotary adjustment for timing purposes. That is to say, the screws 35 can be loosened, the disc 34 rotated to the right or the left to time the feed of the body blanks 12 with other parts of the machine, and when such timing has been accomplished the screws 35 can be tightened. A crank pin 40 is affixed to the crank disc 34 and is rotatably connected to a link 41 which is rotatably connected at 42 to one end of a link or lever 43, the other end of which is fixed to a shaft 43a to which another lever 44 is fixed. The lever 44 is rotatably connected at its other end to an adjustable connecting rod 45 which is rotatably connected to a lever 46. The lever 46 is fixed to a shaft 47 suitably journalled in the framework of the machine and a second lever 48 is also fixed to the shaft 47, the other end of the lever 48 being rotatably connected at 49 to one end of a lever 50, the other end of which is rotatably connected to a pin or stub shaft 51 projecting from the slide member 30. It is by means of the linkage just described and which is shown in FIGURE 5, that the suction feed 27 is caused to move up and down.

As will be seen, and as is best shown in FIGURE 10, the suction ducts 29 of the suction feed mechanism 27 have an extension 56. This extension connects to a suitable vacuum system or suction pump (not shown) whereby, normally, suction is applied to the cups 28 whereby when they reach the top of their travel and contact the lowermost body blank 12, they will apply suction to the blank and on subsequent downward movement of the suction feed 27 and cups 28, they will act to withdraw the lowermost blank from the hopper 25.

A valve member 57 is provided which is pivoted on a pin 58 carried on slide 30 and it is urged toward and is normally held in closed position adjacent the duct 56 by a spring 59 suitably lodged in sockets formed in the slide member 30 and in the valve member 57. Also affixed to the valve member 57 is a lever 60 having a roller 61 at its lower end. When the slide member 30 reaches a certain predetermined point in its downward travel, the roller 61 engages a cam 62 which is fixed to the framework of the machine by adjustable screw and slot means as illustrated. When this occurs the valve member is rocked counter-clockwise as viewed in FIGURE 10, thereby opening the duct 56 to the atmosphere and breaking the vacuum or suction so that the blank 12 is free to be fed into the machine, by means hereinafter described. It will be apparent that, by adjusting the cam 62 up or down, the timing of the breaking of suction can be accurately and precisely controlled.

The feed mechanism whereby the blanks are fed forwardly into the machine is best shown in FIGURE 5. It comprises a lever 63 fixed to slide 30 and a link 64 rotatably connected at one end to the lever 63 and its other end to a lever 65 which, in turn, is fixed to a shaft 66 rotatably mounted on the framework of the machine. Also affixed to the shaft 66 is an arm 67 having a kicker member 68 at its outer end. It will be apparent that the drive mechanism originating with the drive shaft 33 will not only cause the suction feed mechanism 27 to move up and down and cause the valve 57 to open and close, but it will also rock the feed arm 67 and kicker member 68 back and forth to kick each blank 12 from the suction cups 28 into the machine all in timed relationship to other elements of the machine.

Referring now more particularly to FIGURES 6, 7, 8 and 9 the beading, scoring and flexing assembly 13 will now be described.

Figure 7:
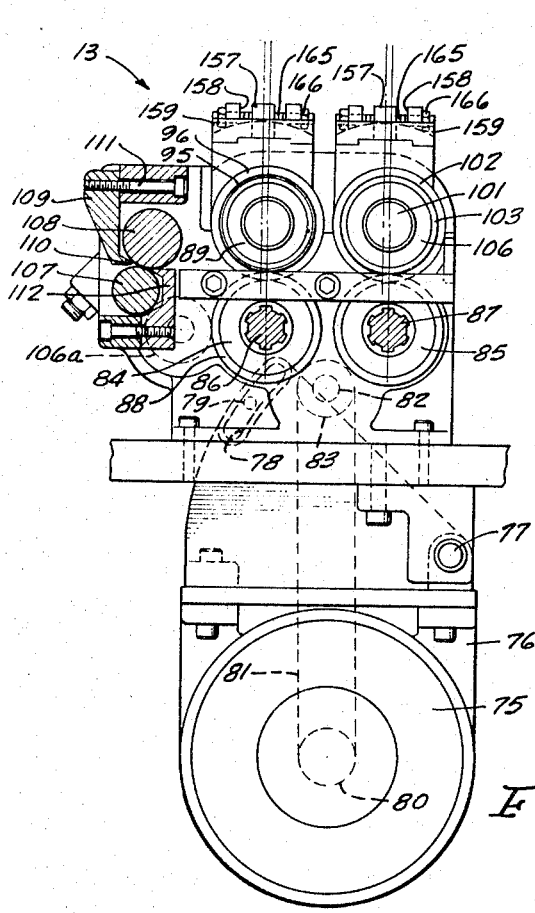
FIGURE 7 is a section taken along line 7—7 of FIGURE 6.

As shown in FIGURE 7 (also in FIGURE 5) a continuously driven motor 75 is provided which is carried by a bracket 76 which is pivotally mounted at 77 on the framework of the machine. The bracket 76 is formed with an elongated arcuate slot 78 which receives a screw 79 which is threaded into the framework of the machine. By loosening the screw 79, the motor 75 can be rotated about the axis of pin 77. When adjusted to the right position, the screw 79 is tightened. By this means a sprocket or toothed wheel 80 driven by the motor can be moved up and down so as to loosen or tighten a toothed belt 81. The chain or belt 81 drives a sprocket or toothed wheel (not shown) on a shaft 82. This mounting of the motor 75 provides a means for adjusting the tightness of the belt 81.

Figure 8:
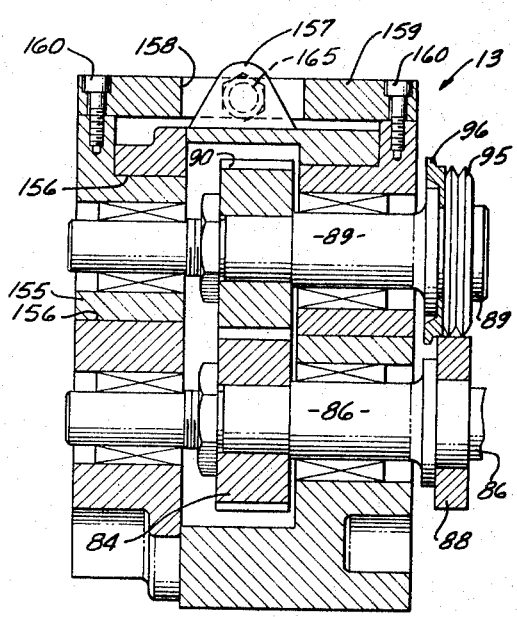
FIGURE 8 is a section taken along line 8—8 of FIGURE 6.

The shaft 82 carries a gear 83 which meshes with two gears 84 and 85, both of which are shown in FIGURE 7, gear 84 being also shown in FIGURE 8. It will be apparent that, by this means, the two gears 84 and 85 are driven in the same direction. Inasmuch as the gears 84 and 85 are identical, it will be apparent that they will rotate at the same speed.

The gear 84 is mounted on a splined shaft 86 and the gear 85 is mounted on a similar splined shaft 87. The purpose of the splined shafts 86 and 87 is to permit adjustment of the gears 84 and 85, in the manner explained hereinafter, to accommodate can bodies of different heights.

Referring now more particularly to FIGURE 8 a backup or pressure roller 88 is mounted on the shaft 86. Above this backup roller and above the shaft 86 is a stub shaft 89 which is fixed to a gear 90 which meshes with and is driven by the gear 84. Mounted on the inboard side of the stub shaft 89 is a scoring roll 95 having two knife edges spaced apart as indicated and bearing against the backup roll 88. Also mounted on the stub shaft 90 is a flanged guide 96 which receives one edge of each body blank as it passes through this part of the machine.

Figure 6:
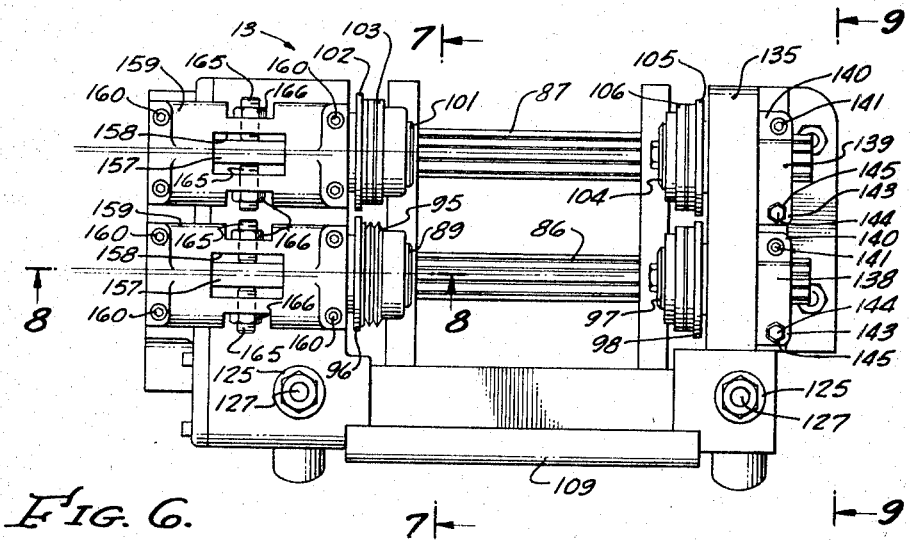
FIGURE 6 is a top plan view of the flexing and scoring mechanism, which also beads the blanks.

As shown in FIGURE 6 there is a stub shaft 97 which is in axial alignment with the stub shaft 89 and is on the opposite side of the machine. Such stub shaft 97 carries a flanged guide member 98 similar to the flanged guide member 96. Mounted beneath the stub shaft 97 and on the shaft 86 is a backup roll (not shown) similar to the backup roll 88.

Referring to FIGURES 6 and 7 there is stub shaft 101 parallel to and in the same horizontal plane as the stub shaft 89, which carries a flanged member 102 similar to the flanged members 96 and 98 and also a beading roll 103. On the shaft 87 there is backup roll (not shown) similar to the backup roll 88 shown in FIGURE 8. On the opposite side of the machine there is another stub shaft 104 in axial alignment with the stub shaft 101 and which carries a flanged guide member 105 and a beading roll 106, beneath which, on the shaft 87, is a backup roll (not shown) similar to the backup roll 88 shown in FIGURE 8.

Referring now to FIGURE 7 a flexing mechanism is shown which is driven from the gear 84 through a gear 106 meshing with a gear (not shown) on the shaft which carries flexing roll 107. The flexing roll 107 is parallel to, is in rolling contact with and beneath and is offset to the left (as viewed in FIGURE 7) with respect to an upper flexing roll 108. The latter is suitably mounted on shafts or trunnions journalled in the framework of the machine. A breaker plate 109 is provided having a tip portion 110, such breaker plate being mounted on the framework to the machine as by means of a capscrew 111. A guide plate 112 having a similar nose portion is bolted to the framework of the machine on the exit side of the flexing rolls 107 and 108.

Figure 9:
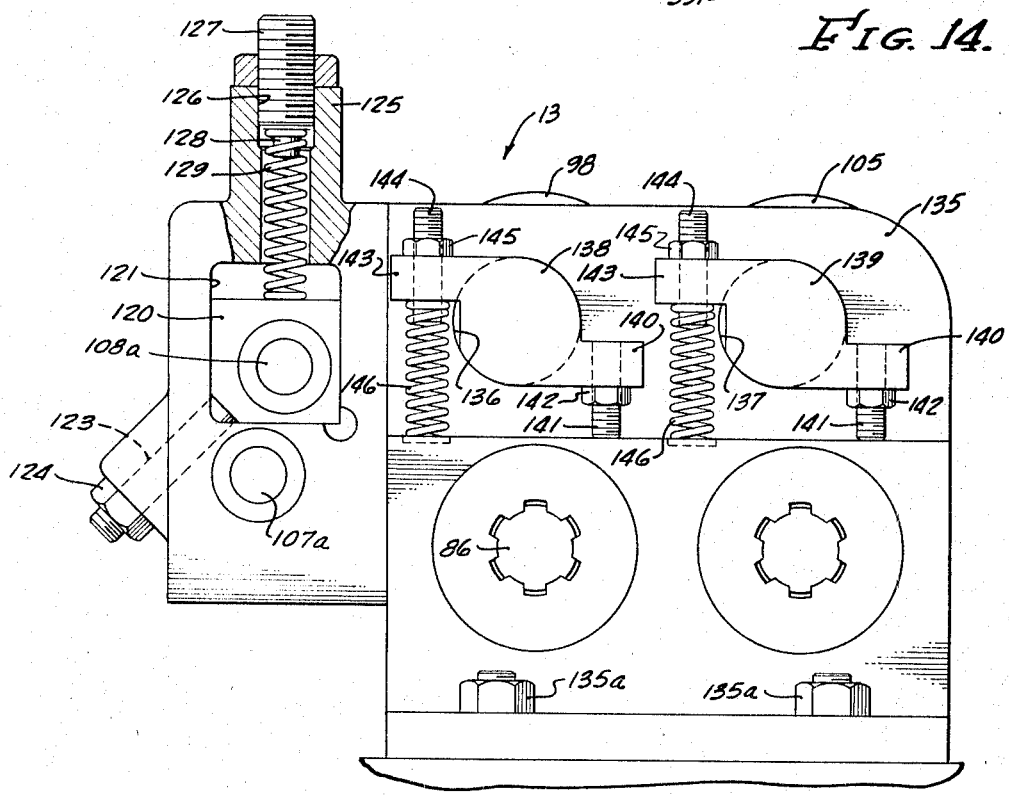
FIGURE 9 is a view taken along line 9—9 of FIGURE 6, showing the flexing and scoring mechanism in end elevation.

Referring now to FIGURE 9, the shafts 107a and 108a of the flexing rolls 107 and 108, respectively, are suitably mounted. The shafts 108a of the upper flexing roll 108, instead of being journalled in the framework of the machine, are journalled in a block 120 which is slidable in an opening 121 formed in the framework of the machine. The lower left hand corner (as viewed in FIGURE 9) of the block 120 is bevelled as illustrated and a screw 123 threaded into the framework of the machine bears against this corner. A lock nut 124 is also provided. By adjustment of the screw 123 the limiting downward position of the block 120, hence of the upper flexing roll 108 is determined. The upper flexing roll 108 is forceably but resiliently held in its downward limiting position by means including a boss 125 having a threaded opening 126 to receive an adjustment screw 127 whose lower end bears against a cap 128 seated in a coil spring 129. (This arrangement is duplicated at the other end of the flexing roll 108.) It will be apparent that the spacing of the flexing rolls 108 and 107 can be adjusted by means of the screw 123.

Still referring to FIGURE 9, a mounting block 135 is provided which has openings 136 and 137 which carry bearing inserts 138 and 139, respectively. The stub shaft 97 (see FIGURE 6) is journalled eccentrically in the bearing insert 138 and the stub shaft 104 (shown in FIGURE 6) is eccentrically journalled in bearing insert 139. Each of the bearing inserts 138 and 139 has an ear 140 projecting to the right as viewed in FIGURE 9 and through which is threaded an adjustment screw 141 which carries a lock nut 142. Each of the bearing inserts 138 and 139 also has another ear 143 projecting to the left as viewed in FIGURE 9 through which an adjustment screw 144 is threaded, such screw carrying a lock nut 145. Each screw 144 is received within the upper end of coil spring 146 which is compressed between the respective ear 143 and the framework of the machine.

It will be apparent that, by adjusting either of the screws 141 the respective bearing insert 138 or 139 will be rotated. Inasmuch as each stub shaft 97 or 104 is eccentrically mounted in its bearing insert 138 or 139, such stub shaft will be moved up or down depending upon the direction or adjustment of the screw 141. When suitable adjustment has been made, the respective lock nut 142 will be tightened. By this means the spacing of the rolls 98 and 106 (see FIGURE 6) can be adjusted in relation to their respective backup rolls. Therefore, adequate but not excessive pressure can be maintained on the body blanks 12 and the depth of beading is also controlled. It will also be apparent that the respective stub shafts 97 and 104 are held firmly but yieldably in place.

Lateral adjustment for can bodies of different height is accomplished as follows: The backup rolls (not shown) are driven by splined shafts 86 and 87 at the right hand side of the machine (as viewed in FIGURE 6). The block 135 (see FIGURES 6 and 9) is suitably fixed to the framework of the machine by means of screws and nuts 135a (see FIGURE 6) which, when loosened, are movable in slots (not shown) in the framework of the machine. By loosening these nuts and screws, shifting the block 135 and then tightening the nuts and screws, adjustment is made.

Referring now more particularly to FIGURE 8 but also to FIGURE 6, the stub shaft 89 there shown is eccentrically mounted for adjustment purposes. The stub shaft 101 (see FIGURE 6) is similarly mounted. Only the mounting of the stub shaft 89 will be described since the mounting of stub shaft 101 is identical.

As will be seen, the stub shaft 89 is journalled in a sleeve 155 which is rotatable within a cylindrical bore 156 in the framework of the machine. The stub shaft 89 is mounted eccentrically with respect to the sleeve 155 with the result that, if the latter is rotated within he bore 156, the stub shaft 89 will be lowered or raised depending upon the direction of rotation of the sleeve 155. To accomplish this rotation for adjustment purposes, and to lock the sleeve in adjusted position, a bracket 157 is provided which is fixed to the framework of the machine and which projects through an opening 158 in a cap 159 which is secured by means of screws 160 to the sleeve 155. Adjustment screws 165 having lock nuts 166 bear against opposite sides of bracket 157. It will be apparent that, by backing off one of the adjustment screws 165 and threading the other adjustment screw 165 further in, the sleeve 155 will be rotated in its bore 156 and, depending upon the direction of such adjustment, the stub shaft 89 will be raised or lowered in relation to the backup roll 88. By this means, it is possible to adjust the normal spacing of the scoring roll 95 from the backup roll 88. By similar means it is possible to adjust the spacing of the beading roll 103 (see FIGURE 6) from its backup roll. By this means the depth of scoring and beading can be controlled and the beading and scoring rolls can be adjusted for wear and for metal of different thickness.

It will be apparent from the description set forth hereinabove and from the accompanying drawings that a mechanism is provided whereby body blanks are fed automatically to a mechanism comprising flexing rolls 107 and 108 and the breaker plates 109 and 112; that each blank is flexed thereby and is then scored along two parallel lines to condition the metal for removal of a tear strip; and that a bead is formed between the score lines by means of the beading roll 103. As an optional feature, the beading rolls 98 and 106 on the opposite side of the machine are provided to form a bead along the opposite edge of the body blank. The purpose of the bead formed between the two score lines is to provide a tracking means for the key when it is employed to open the can. The purpose of beading the other side of the body blank (corresponding to the other end of the can) is to provide, where desired, a bead which together with the first bead, will serve to raise the bulk of the blank off the feed table and to prevent scratching of lithographing on the surface of the blank as it passes through the machine.

As stated hereinabove before the folding operations are carried out to form the collar fold, the blanks are notched, slit and blanked to form the notches and slits necessary to allow for extra metal thickness at the junction of the side seam and the end seam and to form the tongue to remove the tear strip with a key. These operations are essentially punching operations and are carried out by reciprocating tools which are well known to the art and require no detailed description herein. However, I have provided a novel drive mechanism for this and certain other parts of the machine, which will now be described primarily with reference to FIGURES 2A, 3 and 4.

Referring to FIGURE 3, the drive shaft 33 may be split and, if so is connected to the remainder of the shaft by a connecting member 175. The drive shaft 33 is connected to a bevel gear 180 within an oil filled gear box 181. The gear 180 meshes with a second bevel gear 182, also within the gear box 181, which is fixed to one end of a cross shaft 183. At its other end the cross shaft 183 is fixed to a gear 184 within the gear box 181. The gear 184 meshes with another gear 186 also within the gear box 181. A crank disc 187 is driven by the gear 186 and to the crank disc 187 is fixed a crank pin 188 (see FIGURE 2A) to which is connected one end of a connecting rod 189. The other end of the rod 189 is rotatably connected to a lever 190. The lever 190 is fixed at its other end to a shaft 200 which in turn is fixed to a lever 201 which is rotatably connected at 202 to one end of a link 203. The other end of the link 203 is rotatably connected at 204 to a plate 205. The plate 205 is slotted at 206 to receive screws 207 which are fixed to a feed bar 208. This drive mechanism is shown diagrammatically in FIGURE 15.

Referring again to FIGURES 3 and 4, the gear 184 meshes with another gear (not shown) above it and within the gear box 181, such gear serving to drive a shaft 215 (see also FIGURE 2A). The other end of the shaft 215 is mounted in a bearing 216 mounted on the framework of the machine. Eccentric collars 217 are mounted on the shaft 215, these eccentrics being adjustable lengthwise of the shaft for can bodies of different diameters. Connected to each of the eccentrics 217 is a rod 218 which is rotatably connected at 219 (see FIGURE 2A) to a link 220. The links 220 are connected to the mechanism (not shown) whereby the blanks are notched, slit and blanked. This portion of the drive mechanism is also shown diagrammatically in FIGURE 15. The notching, slitting and blanking tools are of well known construction and need not be described.

Figure 15:
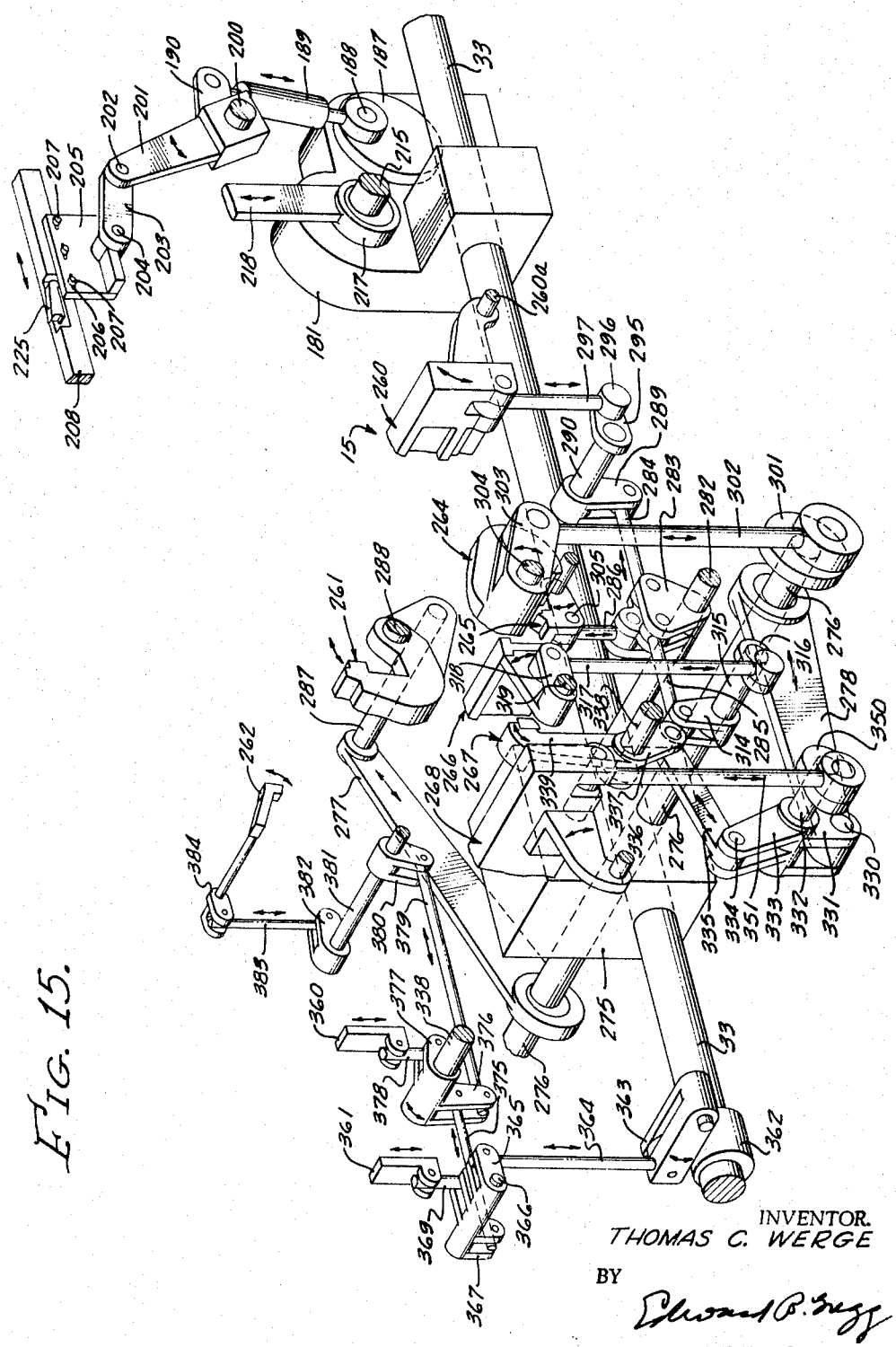
FIGURE 15 is a diagrammatic, perspective view of the drive mechanism for the feed bar, and for the body stops and the folding tools.

As shown in FIGURES 2A and 2B and also in FIGURE 15 the feed bar 208 carries feed dogs 225 which are located in recesses formed in the feed bar and are biased upwardly by springs (not shown) in accordance with custom in this type of feed mechanism. There are two feed bars 208, one on each side of the machine and each feed bar carries the same number of dogs 225 arranged in aligned pairs and on opposite sides of the machine. The feed dogs at the collar fold end of the machine (FIGURE 2B) are differently shaped because the feed bars are below the tin line, i.e., below level of the body blanks, to allow space for the folding operations.

As shown in FIGURE 2A a cover plate 226 is provided at the right hand end of the machine (as viewed in FIGURE 2A) beneath which the flexed, scored and beaded body blanks are delivered. A handle 226a is affixed to this cover plate. The cover plate is integral with a pair of hinge arms 227 which are pivotally connected to the framework of the machine at 228. A spring 229 affixed at one end to the frame of the machine and at the other end to one of the arms 227, serves to hold the cover 226 firmly but yieldably in position. A latch member 231 is provided which engages a latch pin 232 projecting from a tubular rod 233. The pin 232 is slidable within the rod 233 and it is held normally in extended, latching position by a spring 234 compressed between the rod 233 and a collar 235. By pushing back the collar 235 against the force of the spring 234 the latching mechanism is unlatched.

The rod 233 is carried by an arm 236 which is pivotally connected at 236a (see FIGURE 2B) to a bracket 238 fixed to the framework of the machine. The arm 236 serves to carry a pressure plate or shoe 237 which is mounted by means of rods 240 carried by the arm 236. Springs 245 urge the shoe 237 downwardly into contact with the body blanks as they travel through this part of the machine, to hold the blanks firmly in contact with the feed table and with the feed bars 208. Microswitches 246 are provided which are carried by the arm 236 and a pair of microswitch contact elements 247 are associated with each microswitch 246, one such element being carried by the microswitch itself and the other by the shoe 237. By this means and by means of a suitable circuit (not shown), if a jam occurs, e.g., if two or more body blanks are delivered to the machine together, the shoe 237 will be caused to move slightly upwardly causing closing of the switch elements 247 and stopping the machine and/or actuating a signal indicating this condition. When the machine is thus stopped automatically (or, in the alternative, when it is stopped by control personnel) the faulty condition can be quickly inspected and relieved by unlatching the pin 232 and latch member 231, and then swinging the bar 235 and shoe 237 upwardly to permit access to and inspection of this part of the machine.

Figure 16A:
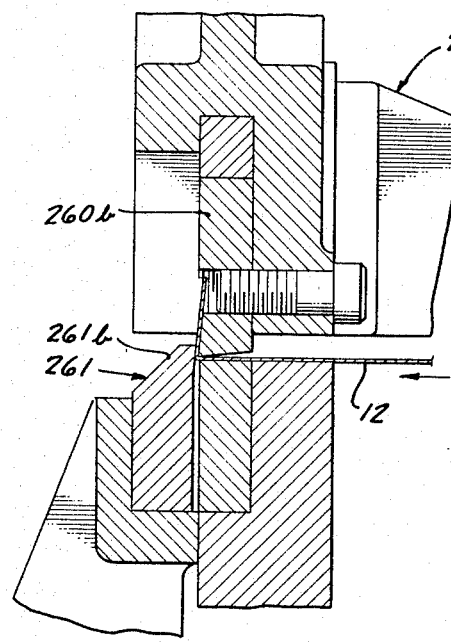
FIGURES 16A, 16B, 16C and 16D are fragmentary detailed views of the collar folding tools for performing the first, second, third and fourth collar folding operations, respectively.

As stated, the collar folding occurs in four steps, which are illustrated in FIGURES 16A, 16B, 16C and 16D. These steps are as follows:

Referring to FIGURE 16A, folding tools 260 and 261 are shown in the act of folding the leading edge of the body blank to a right angle bend. This constitutes the first folding operation.

Figure 16B:
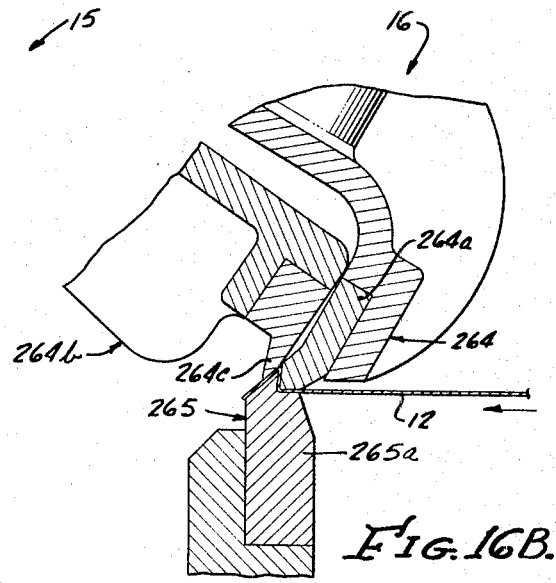

FIGURE 16B shows folding tools 264 and 265 in the act of folding over the upwardly projecting metal to an acute angle, such being the second folding operation.

Figure 16C:
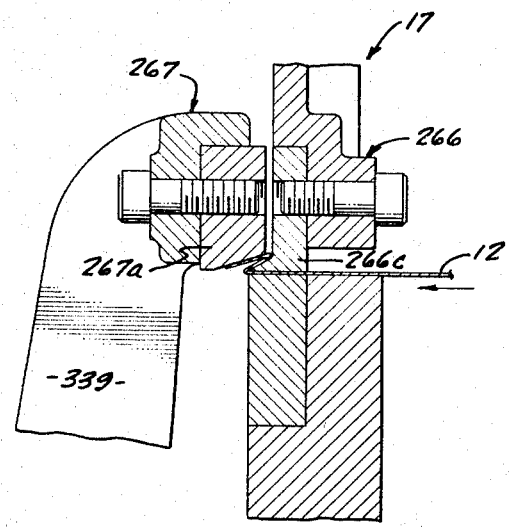

FIGURE 16C shows folding tools 266 and 267 in the act of partially flattening the edge of the body blank, such being the third folding step.

Figure 16D:
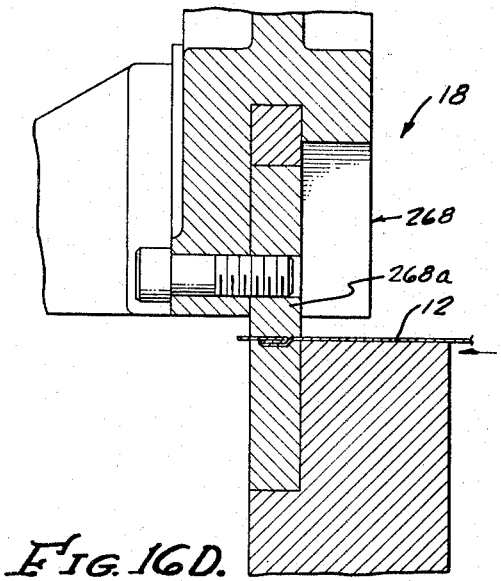

FIGURE 16D shows folding tool 268 in the act of completely flattening the metal, such being the fourth folding step.

Referring now to FIGURE 2B and from time-to-time to the diagrammatic perspective showing in FIGURE 15, the drive shaft 33 drives suitable gearing (not shown) in gear box 275 which results in rotation of main cross shaft 276. A first main lever 277 is eccentrically mounted on and is oscillated by the main cross shaft 276 and a second main lever 278 is also mounted eccentrically on the cross shaft 276 and is oscillated thereby. The oscillating motions of the levers 277 and 278 are indicated by the arrows shown thereon in FIGURES 2B and 15. A cam 279 is shown affixed to the cross shaft 276 and two cam follower rollers 280a and 280b are shown in contact with the cam 279. The cam follower rollers 280a and 280b are mounted at the ends of arms or levers 281a and 281b, respectively, which are affixed at their other ends to a rock shaft 282 to which a bracket 283 is fixed. Horizontal rods 284 and 285 are rotatably connected to the bracket 283, as is a vertical rod 286. The motions of rods 284, 285 and 286 are oscillating motions as indicated by the arrows associated with these rods.

The lever 277 is rotatably connected at 287 to the forming tool 261 which is pivotally mounted on the framework of the machine at 288. The oscillating motion of the tool 261 is indicated by arrow placed thereon. The horizontal rod 284 is rotatably connected at its outer end to a link 289 which is fixed to a shaft 290. The shaft 290 is rotatably connected by a lever 295 (best shown in FIGURE 15) to a pin 296 affixed to the lower end of a vertical rod 297. The vertical oscillatory motion of rod 297 (indicated by the arrow adjacent thereto in FIGURE 15) causes the forming tool 260 to oscillate, the latter being pivotally mounted on a shaft 260a as shown in FIGURE 15.

A stop and registration member 262 is operated in the manner hereinafter described by other elements of the drive mechanism.

Referring more particularly to FIGURE 16A, as each body blank is brought to the first collar forming station and is stopped and registered in the manner hereinafter described, the steel insert 260b of the forming tool 260 will be brought down upon the body blank to hold it firmly upon the feed table. The steel insert 261b in the forming tool 261 will move up to bend the edge of the body blank projecting beyond the steel insert 260b until it assumes a position perpendicular to the remainder of the blank. Thereafter, by reason of reverse movements of the lever 277 and of the rod 297, the tools 260 and 261 are retracted so that the body blank is free to progress to the next station.

The drive for the tools 264 and 265 at the second folding station will now be described. Preliminarily, it is noted that the tool 265 itself acts as a stop and registration member so that a separate stop and registration member, such as that shown at 262, is not required.

As is more clearly shown in FIGURE 15, a crank disc 301 is fixed to the main cross shaft 276 to which a vertical rod 302 is rotatably and eccentrically connected so that it undergoes a generally vertical oscillatory movement as indicated by the arrow shown thereon in FIGURE 15. At its upper end the rod 302 is rotatably connected to a clevis member 303 which is rotatable on a shaft 304 (also shown in FIGURE 2B) and which is integral with the tool 264. The vertical rod 286 above mentioned, which is reciprocated by cam 279 (see FIGURES 2B and 15) is rotatably connected at 305 to the other forming tool 265. It will be apparent that, by this means, the tools 264 and 265 are given the motions indicated.

The operation of the tools 266 and 267 at the third folding station will now be described.

The horizontal rod 285 appearing near the center of FIGURE 2B is connected by a clevis member 314 to a shaft 315. Also fixed to the shaft 315 is a lever 316 (best shown in FIGURE 15) to which is connected a vertical rod 317 which oscillates in the directions indicated by the arrow. At its upper end the rod 317 is rotatably connected to a lever 318 which is integral with the tool 266 and is rotatable on a shaft 319. It will be apparent that the tool 266 is given an arcuate oscillatory movement as indicated by the arrow adjacent thereto in FIGURE 2B.

The mating tool 267 is operated as follows: The second main lever 278 is rotatably connected at 330 to a lever 331 fixed to a shaft 332 which is also fixed to a lever 333. The lever 333 is rotatably connected at 334 to an adjustable connecting rod 335 which is rotatably connected at 336 to a lever 337. The lever 337 is fixed to a shaft 338 which is also fixed to a lever 339 which is integral with the tool 267.

The tool 268 at the fourth folding station is operated as follows (see FIGURES 2B and 15): A lever 350 is fixed to shaft 332 and is rotatably connected to the lower end of a vertical rod 351, the upper end of which is rotatably connected to the tool 268. It will be apparent that the tool 268 is caused to reciprocate in a vertical direction.

As stated, FIGURES 16A, 16B, 16C and 16D are fragmentary detailed views of the forming tools at the four folding stations. The operation of these tools has been described above. The detailed construction of these tools is well known in the art and requires no detailed description here. It will be seen that each tool has an insert which is designated 260b, 261b, 264a, 265a, 266a, 267a or 268a. Each such insert is removable for repair or replacement; it is made of hardened steel; and it is shaped to accomplish the intended function, which will be apparent from FIGURES 16A through 16D and from the description hereinabove, such also being well known in the art. In the case of the tool 264 at the second folding station (see FIGURE 16B), there is also a second part to the tool which is designated 264b which has an insert 264c having a shape and function as illustrated. At the proper moment it is pivoted relatively to the parts 264a and 265a (which at this moment are stationary) to form the acute angle bend as shown. This pivoting, relative movement is accomplished in a manner which is well known in the art and need not be described in detail herein. Suffice it to say that the part 264b is rigidly fixed to the pivot shaft 304 (see FIGURE 2B) but the part 264a is resiliently connected to part 264b and follows it until it reaches the position shown in FIGURE 16B, after which it remains in that position while continued motion of the shaft 304 causes the part 264c to continue its downward movement.

As stated, stop and registration members are required at the first, third and fourth folding stations whereas, at the second folding station the tool 265 acts as a stop and registration member. The stop 262 at the first station has been referred to. Stops 360 and 361 are provided at the third and fourth stations, these being most clearly shown (although diagrammatically) in FIGURE 15. These three stop and registration members 262, 360 and 361 are operated in synchronism as follows:

Main drive shaft 33 has a cam 362 mounted thereon on which a cam follower 363 rides. The follower 363 is connected to a rod 364 which is rotatably connected to a lever 365 which is fixed to a shaft 366. A lever 367 is also fixed to the shaft 366 and it is also connected to a rod 369 which is connected to the stop member 361 at the fourth folding station. It will, therefore, be apparent that as main drive shaft 33 and cam 362 rotate, the stop and registration member 361 will reciprocate.

Lever 367 is also connnected to a horizontal rod 375 which is connnected to a lever 376 which is loosely mounted on shaft 338. A lever 377 integral with lever 373 is connnected to a rod 378 which is connected to the stop 360 at the third folding station.

The lever 376 is also connected to a rod 379 which is connected to a lever 380 fixed to a shaft 381. The shaft 381 is also fixed to a lever 382 which is connected to a rod 383. The rod 383 is connected to a lever 384 which is fixed to a shaft 385 which in turn is fixed to the tool 262.

It will, therefore, be apparent that the stops 360 and 361 at the third and fourth stations are moved up into registering positions and that the tool 262 is moved down into registering position to stop and register a body blank at the respective stations, and that the drive for all of these derives from the cam 362. The timing is such that each of the stops 262, 360 and 361 is brought into position at the same time to stop a body blank at each of the first, third and fourth stations while at the second station the tool 265 is brought into position to stop a body blank at that station.

Figure 12:
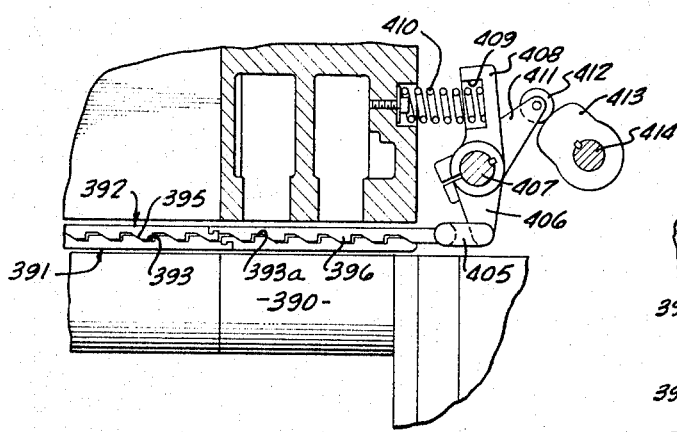
FIGURE 12 is a fragmentary view, partly in vertical section and partly in side elevation, of the clamp mechanism for clamping body blanks to the forming horn.
Figure 13:
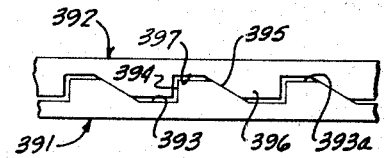
FIGURE 13 is a fragmentary view on a larger scale than FIGURE 12, showing the clamping bar arrangement used to clamp the body blanks to the forming horn.
Figure 14:
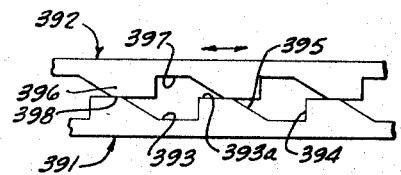
FIGURE 14 is a similar view but at a different stage of operation.

Referring now to FIGURES 12, 13 and 14, a body clamp construction is there shown which constitutes an improvement upon body clamps heretofore in use. As illustrated in FIGURE 12, a horn or mandrel 390 is provided which may be of the usual construction and around which the body blanks are wrapped and their hooks are engaged. As is well known it is necessary to clamp the body blank firmly to the mandrel or horn so that it will not shift or become misaligned and so that it is held firmly in position while wing clamps (not shown) wrap the blank about the horn and interengage the hooks to form the side seam. Thereafter, as is well known a bumper (not shown) operates to bump the interengaged hooks and form the side seam, following which the side seam is soldered in a soldering apparatus (not shown).

I provide a body clamp in the form of two mating bars 391 and 392. The bottom bar 391 is supported by suitable means (not shown) so that it has a limited freedom of vertical movement and the upper bar 392 is supported by suitable means so that it has limited freedom of longitudinal movement, as indicated by the arrows in FIGURE 14. As illustrated, the bars 391 and 392 may be of sectional construction, having tongue and groove joints to connect the sections end to end.

As is well known in the art, the body clamp (in this case the lower bar 391) is loosely held so that body blanks can move in from right to left as viewed in FIGURE 12; then the body clamp is forced down on the body blank to clamp it to the horn. This clamping is accomplished by the means which will now be described.

As will be seen, the clamping bar 391 is formed with spaced notches 393 separated by high points 393a. Each of the notches 393 has a rearward vertical end portion 394 and a sloping forward portion 395, the angle of which may be about 30 degrees. The upper bar 392 is formed with projecting portions or teeth 396 which fit the notches 393 and with corresponding notches 397 to mate with the clamp bar 391 as shown in FIGURE 13. The leading or forward portion of each of the tooth members 396, which is indicated by the reference numeral 398, has a very slight slope upwardly to the left as viewed in FIGURES 13 and 14. The angle of this slope is small, e.g., about 1 to 2 degrees.

The upper bar 392 is pivotally connected at one end to a link 405, which is in turn pivotally connected to a lever 406 affixed to a shaft 407. The lever 406 has an upward extension 408 formed with a socket 409 to receive the coil spring 410 which is compressed between the lever 406 and the framework of the machine. Also fixed to the shaft 407 is a lever 411 having a roller 412 rotatably mounted at its outer end and bearing upon a cam 413 which is fixed to a shaft 414.

The cam 413 is operated in timed relation to other elements of the machine, so that each time a body blank is fed to the horn 390, the cam allows the spring 410 to rock the lever 406 in clockwise direction as viewed in FIGURE 12, thereby moving the upper bar 392 from right to left. In so doing the lower clamp bar 391 will be moved downwardly rapidly by a cam action by reason of the steep inclined surfaces on these bars. However, during the last increment of forward movement of the upper bar 392 its gently sloping sections 398 will act on the teeth 393a to cause the lower clamp bar to move down much more slowly. Therefore, the most of the downward travel of the clamp bar 391 occurs rapidly but in the last increment of its downward motion the travel is slow, thereby minimizing shock and attendant disadvantages.

It will, therefore, be seen that a novel and very useful machine for forming body blanks, particularly those having a collar fold, has been provided.

I claim:

1. A collar fold machine of the character described comprising four stations for folding an edge of a body blank in four operations as follows:
   (1) a marginal portion of the blank is folded up substantially perpendicularly to the plane of the blank,
   (2) the resulting perpendicular marginal portion is then folded about a medial line parallel to the plane of the blank to form a double angle marginal portion,
   (3) said double angle marginal portion is then partially flattened upon the body blank, and
   (4) said partially flattened portion is then further flattened to form a complete collar fold,
said machine comprising:
   (a) a pair of cooperating movable tools at each of the first three of said stations to perform the respective operations and a single movable tool at the fourth station for performing the fourth operation,
   (b) an automatic feed and stop means for feeding body blanks in sequence and in increments and for stopping each blank in turn at each of said stations in registry with the tools or tool at said station;
   (c) a main rotary drive element, and
   (d) means connecting said rotary drive element to each of the seven movable tool members at said stations to operate the same in timed relationship to the feed and registration of the body blanks.

2. The machine of claim 1 wherein said rotary drive element is a shaft located beneath and transversely to the path of movement of said body blanks.

3. The improvement of claim 2 wherein the means connecting said shaft to said tools comprises a pair of oppositely directed levers oscillated by rotation of said shaft and means connecting said levers to certain of said tools, and eccentric means rotated by said shaft and means connecting said eccentric means with the other of said tools.

4. The improvement of claim 2 wherein a pair of levers and eccentric means are mounted on and operated by rotation of said shaft, said levers being oscillated by the shaft and said eccentric means being rotated by said shaft, and means interconnecting said levers and eccentric means to said tools to operate all of the same.

5. The improvement of claim 4 wherein said eccentric means comprises a cam and a separate eccentric.

6. A collar fold machine comprising a feed table, means for automatically feeding can body blanks along said table by increments and in succession and for stopping each blank in sequence at each of said four stations, a pair of movable tools at each of the first three of said stations and a single movable tool at the fourth station, the tools at said stations being operable to form, in sequence, a right angular marginal bend, a double angle marginal bend having a right angular portion and an acute angular portion, a partially flattened double angle bend and a fully flattened collar fold, said machine having a drive for said tools as follows:
   (a) a single shaft beneath said feed table and transverse thereof,
   (b) a pair of oppositely extending levers mounted on and oscillated by rotation of said shaft,
   (c) a cam rotated by said shaft,
   (d) an eccentric rotated by said shaft,
   (e) means interconnecting one of said levers with one of the first pair of tools,
   (f) means interconnecting said cam with the other of said first pair of tools,
   (g) means interconnecting said cam with one of the second pair of tools,
   (h) means interconnecting said eccentric with the other of said second pair of tools,
   (i) means interconnecting said cam with one of the third pair of tools,
   (j) means interconnecting the other of said levers with the other of said third pair of tools,
   (k) means interconnecting the other of said levers with the fourth tool,
whereby said tools are operated in timed relationship to the feed and registration of body blanks to perform the stated sequence of folding operations.

7. A can making machine wherein flat can body blanks are fed stepwise along a feed table to stop in sequence at each of four stations to have a forming operation performed on the flat blanks, registration means comprising a stop at each of at least three of said stations and means for operating said stops comprising a single rotary member and means connecting said rotary member to each of said stops to operate the same in synchronism.

8. The machine of claim 7 wherein the rotary member is in the form of a constantly rotating shaft and an eccentric rotated by said shaft, a rod reciprocated by said eccentric and mechanical linkages including rods and levers connecting said first mentioned rod to said stops.

9. A can body making machine of the character described comprising a feed table having a portion for notching, slitting and folding the edges of body blanks to condition the blanks to form tubular can bodies at a body forming station, said machine also having a portion for forming a collar fold in each body blank, each portion of the machine having a plurality of stations for various steps in the respective operations conducted thereat, and one or more tools at each station for performing the respective operation thereat, said machine portions being in line, a main drive shaft located underneath and parallel to said feed table, and a can body feed in the form of a feed bar reciprocable longitudinally of said feed table, feed dogs carried by said bar to engage said body blanks on the feed table and to carry them forwardly through the machine by increments, and means for so operating said feed bar and feed dogs in the form of a mechanical connection between said shaft and said feed bar, such means being located underneath the feed table.

10. The machine of claim 9 wherein said mechanical connection is in the form of a cross shaft driven by said main drive shaft and eccentric means interconnecting said cross shaft and feed bar to reciprocate said feed bar.

11. In a machine of the character described comprising a feed table having a portion with stations for notching, slitting and folding body blanks to condition the same for forming into tubular can bodies at a can body forming station and a portion in line with the first mentioned portion to form a collar fold in each body blank adapted to form a circumferential collar fold in such tubular bodies to permit replacement of a cover removed by means of a key, one or more tools at each of said stations for performing the respective operations thereat and a reciprocable feed bar with feed dogs attached thereto to feed body blanks along said feed table by increments whereby each body blank is stopped at each station for performance of the respective operation thereat, the improvement which comprises a drive in the form of a single main drive shaft located underneath and extending the length of said feed table, means interconnecting said shaft to the tools at each of said stations to operate the same and means connecting said shaft with said feed bar to reciprocate the same.

12. The machine of claim 11 including also stop and registration means at a plurality of said stations and means operated by said shaft for operating said stop and registration means to stop and register the body blanks of the respective stations.

13. A scoring machine for scoring sheet metal blanks and the like, comprising a scoring roll and a backup roll mounted in parallelism to one another, one of said rolls being eccentrically mounted to permit adjusting the spacing of the rolls to accommodate sheet metal of different thicknesses.

14. A scoring machine of the character described comprising:
   (a) a stationary frame,
   (b) a first pair of tangentially arranged rolls rotatably mounted in said frame, one of said first pair of rolls being formed with a knife edge to score sheet metal passing between the rolls, the other of said first pair of rolls being a backup roll,
   (c) mounting means for one of said first pair of rolls which is eccentric to the axis of such roll whereby, upon rotation of the mounting within the frame, the spacing of between said first pair of rolls can be adjusted,
   (d) and a second pair of rolls spaced from said first pair of rolls, also tangentially arranged and rotatably mounted in said frame with one of such pair being co-axial to one of said first pair of rolls and the other being co-axial to the other of said first pair of rolls.

15. The scoring machine of claim 14 wherein one of said second pair of rolls is also eccentrically mounted in said frame and is spring loaded to accommodate itself to metal of different thicknesses.

16. The machine of claim 15 wherein said first pair of rolls are fixed to intermeshing gears whereby one of the gears drives the other, and wherein said second pair of rolls are mounted in a shiftable part of the frame to adjust the spacing of the second pair of rolls from the first pair of rolls to accommodate sheet metal of different thicknesses and different widths.

17. A body clamp assembly for a can body forming machine comprising a horn about which can body blanks are wrapped to form a side seam, a body clamp located adjacent and parallel to said horn and having a limited freedom of movement toward and away from the horn to clamp body blanks onto the horn and to release the same, respectively, and means for effecting clamping movement of said body clamp comprising an operating member reciprocable longitudinally of said horn and body clamp and located adjacent said body clamp, said operating member and body clamp having cooperable inclined surfaces whereby, when said operating member is shifted in one direction, it imparts to said body clamp a component of movement toward said horn, said cooperating inclined surfaces including a relatively steep initial portion for effecting such component of movement at relatively rapid speed and a terminal portion having a much smaller angle for effecting the terminal portion of such component of movement at a relatively much slower speed.

References Cited by the Examiner
UNITED STATES PATENTS
2,142,235   1/1939   Burns _____ 113—7

CHARLES W. LANHAM, *Primary Examiner.*
R. D. GREFE, *Assistant Examiner.*